(12) United States Patent
Maegawa et al.

(10) Patent No.: US 8,389,137 B2
(45) Date of Patent: Mar. 5, 2013

(54) METHOD OF REUSING RECHARGEABLE BATTERY

(75) Inventors: Katsunori Maegawa, Toyohashi (JP);
Toshiaki Nakanishi, Toyohashi (JP);
Katsunori Komori, Toyohashi (JP)

(73) Assignee: Panasonic EV Energy Co., Ltd., Kosai-Shi, Shizuoka (JP)

( * ) Notice: Subject to any disclaimer, the term of this patent is extended or adjusted under 35 U.S.C. 154(b) by 315 days.

(21) Appl. No.: 12/541,263

(22) Filed: Aug. 14, 2009

(65) Prior Publication Data

US 2010/0040939 A1 Feb. 18, 2010

(30) Foreign Application Priority Data

Aug. 18, 2008 (JP) ................................ 2008-210030

(51) Int. Cl.
H01M 10/42 (2006.01)
H01M 6/50 (2006.01)
H01M 10/44 (2006.01)

(52) U.S. Cl. ............................... 429/49; 429/50; 29/763

(58) Field of Classification Search .................. 320/109; 429/61, 49, 50; 29/763
See application file for complete search history.

(56) References Cited

U.S. PATENT DOCUMENTS

| 5,523,182 A * | 6/1996 | Ovshinsky et al. | 429/223 |
| 6,696,204 B2 * | 2/2004 | Sato et al. | 429/309 |
| 6,963,371 B2 * | 11/2005 | Sakurai et al. | 348/301 |
| 7,119,517 B2 * | 10/2006 | Mikuriya et al. | 320/109 |
| 7,710,073 B2 | 5/2010 | Yamauchi et al. | |
| 7,964,299 B2 * | 6/2011 | Hashimoto | 429/49 |

FOREIGN PATENT DOCUMENTS

| JP | 06-094809 | 4/1994 |
| JP | 08-315868 | 11/1996 |
| JP | 2005-302337 | 10/2005 |
| JP | 2008-97900 | 4/2008 |

* cited by examiner

*Primary Examiner* — Patrick Ryan
*Assistant Examiner* — Julian Anthony
(74) *Attorney, Agent, or Firm* — Workman Nydegger

(57) ABSTRACT

A method of reusing a rechargeable battery includes collecting from users assembled batteries formed by rechargeable batteries, each holding initial individual information including at least a manufacturing date and an initial weight of the rechargeable battery. The collected assembled batteries are dismantled into rechargeable batteries, each holding the individual information. The rechargeable batteries of the dismantled assembled batteries are classified into groups based on the initial individual information of the rechargeable batteries and individual information of the plurality of rechargeable batteries obtained after the dismantling. A regenerated assembled battery is rebuilt reusing rechargeable batteries that have been classified into the same group.

13 Claims, 4 Drawing Sheets

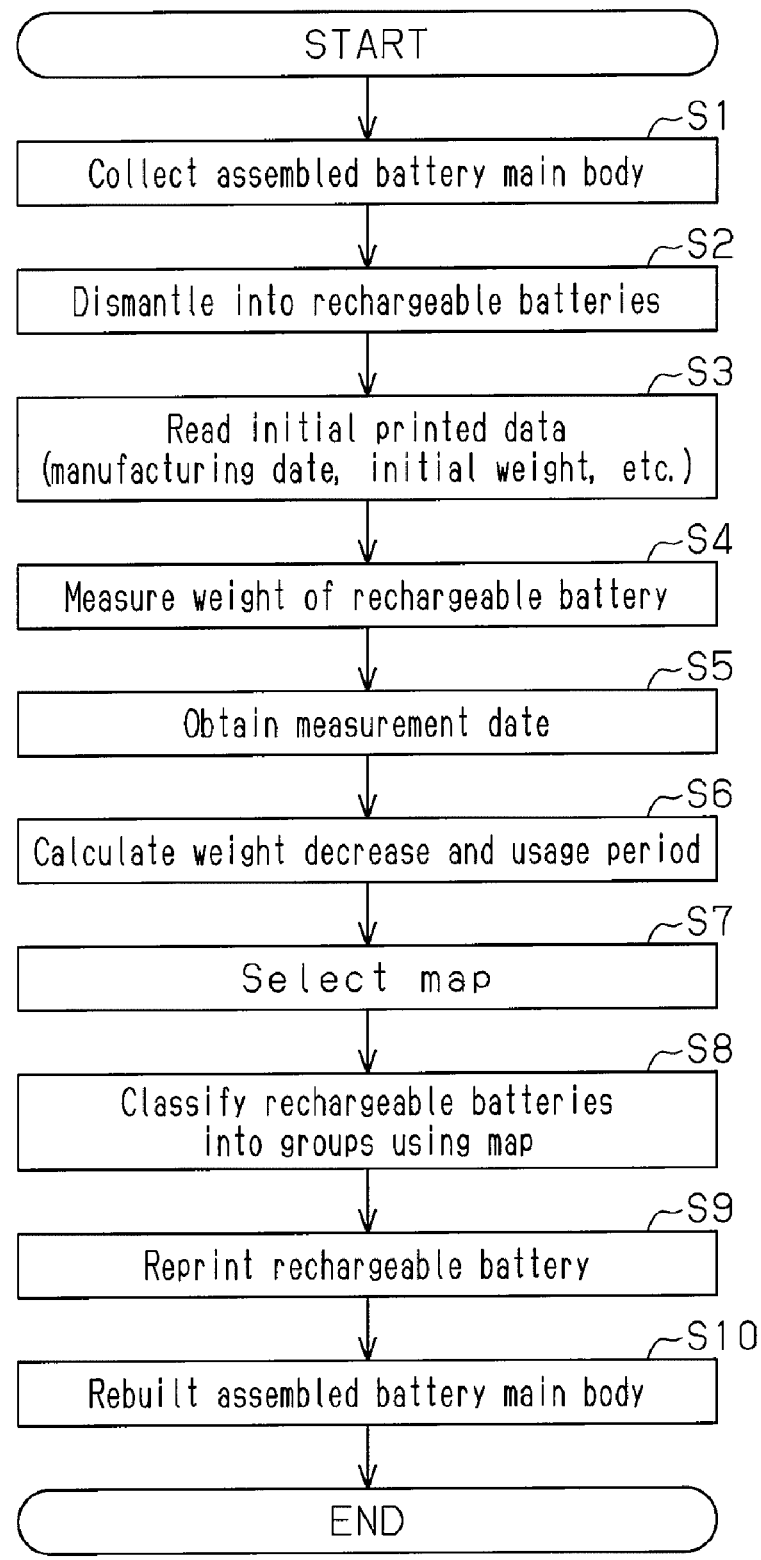

METHOD OF REUSING RECHARGEABLE BATTERY

CROSS-REFERENCE TO RELATED APPLICATIONS

This application is based upon and claims the benefit of priority from prior Japanese Patent Application No. 2008-210030, filed on Aug. 18, 2008, the entire contents of which are incorporated herein by reference.

BACKGROUND OF THE INVENTION

The present invention relates to a method of reusing a rechargeable battery to form a regenerated assembled battery by combining rechargeable batteries of a plurality of assembled batteries collected from users.

An assembled battery formed by a plurality of rechargeable batteries is used as a power source for an electric vehicle, a hybrid electric vehicle, and the like. Studies are being conducted to reuse such assembled batteries, which are used as power sources for vehicles. In this study, assembled batteries are collected from users to rebuild an assembled battery that can be reused by a user. A used assembled battery has battery characteristics (overcharge, overdischarge, voltage variations caused by memory effect, total charge-discharge electrical capacity, etc.) that vary from an unused assembled battery. In addition, the battery characteristics of an assembled battery vary differently depending on the usage environment and usage frequency. The battery characteristics also vary between the rechargeable batteries that form an assembled battery due to individual differences between the rechargeable batteries. Therefore, from the rechargeable batteries of the collected assembled batteries, those having superior battery characteristics are selected and combined to rebuild an assembled battery.

In the selection of collected rechargeable batteries, the rechargeable batteries must be evaluated or inspected. Japanese Patent No. 2727149 and Japanese Patent No. 3364049 describe examples of such evaluations. Japanese Patent No. 2727149 describes a process for determining the state of the battery characteristics for a used rechargeable battery from a discharge characteristic curve. This process is based on the fact that the discharge characteristics vary as the use of a rechargeable battery continues. Japanese Patent No. 3364049 describes a process for evaluating the lifespan of a rechargeable battery. In this process, the relationship between the electrolyte amount of a rechargeable battery and the charge capacity (battery capacity) is evaluated beforehand. Then, the residual amount of the electrolyte is predicted from changes in the measured weight of the rechargeable battery. The lifespan of the rechargeable battery is predicted based on such a measurement.

SUMMARY OF THE INVENTION

The inventors of the present application have found the following facts. An assembled battery may be rebuilt by paying particular attention to the absolute characteristics of each rechargeable battery evaluated through the processes described above. However, the performance of such a rebuilt assembled battery may not satisfy a reusable level. Even if the rebuilt assembled battery includes rechargeable batteries having superior absolute characteristics, when there are significant characteristic variations between the rechargeable batteries, the performance of the rebuilt assembled battery may not satisfy the reusable level. In order for the performance of a rebuilt assembled battery to satisfy a reusable level, each rechargeable battery must satisfy the requirements for the absolute characteristics, and the rechargeable batteries must have relatively similar characteristics (small variations in characteristics).

The inventors of the present application have found a process that easily determines for collected rechargeable batteries whether or not relative characteristic requirements and absolute characteristic requirements are satisfied to simplify the rebuilding of an assembled battery.

One aspect of the present invention is a method of reusing a rechargeable battery includes collecting from users a plurality of assembled batteries formed by a plurality of rechargeable batteries, each holding initial individual information including at least a manufacturing date and an initial weight of the rechargeable battery; dismantling the plurality of collected assembled batteries into the plurality of rechargeable batteries, each holding the individual information; classifying the plurality of rechargeable batteries of the dismantled assembled batteries into groups based on the initial individual information of the plurality of rechargeable batteries and individual information of the plurality of rechargeable batteries obtained after the dismantling; and rebuilding a regenerated assembled battery reusing rechargeable batteries that have been classified into the same group.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart showing the procedures for rebuilding an assembled battery.

DETAILED DESCRIPTION OF THE PREFERRED EMBODIMENTS

A preferred embodiment of the present invention will now be discussed with reference to the drawings.

Figure 1:
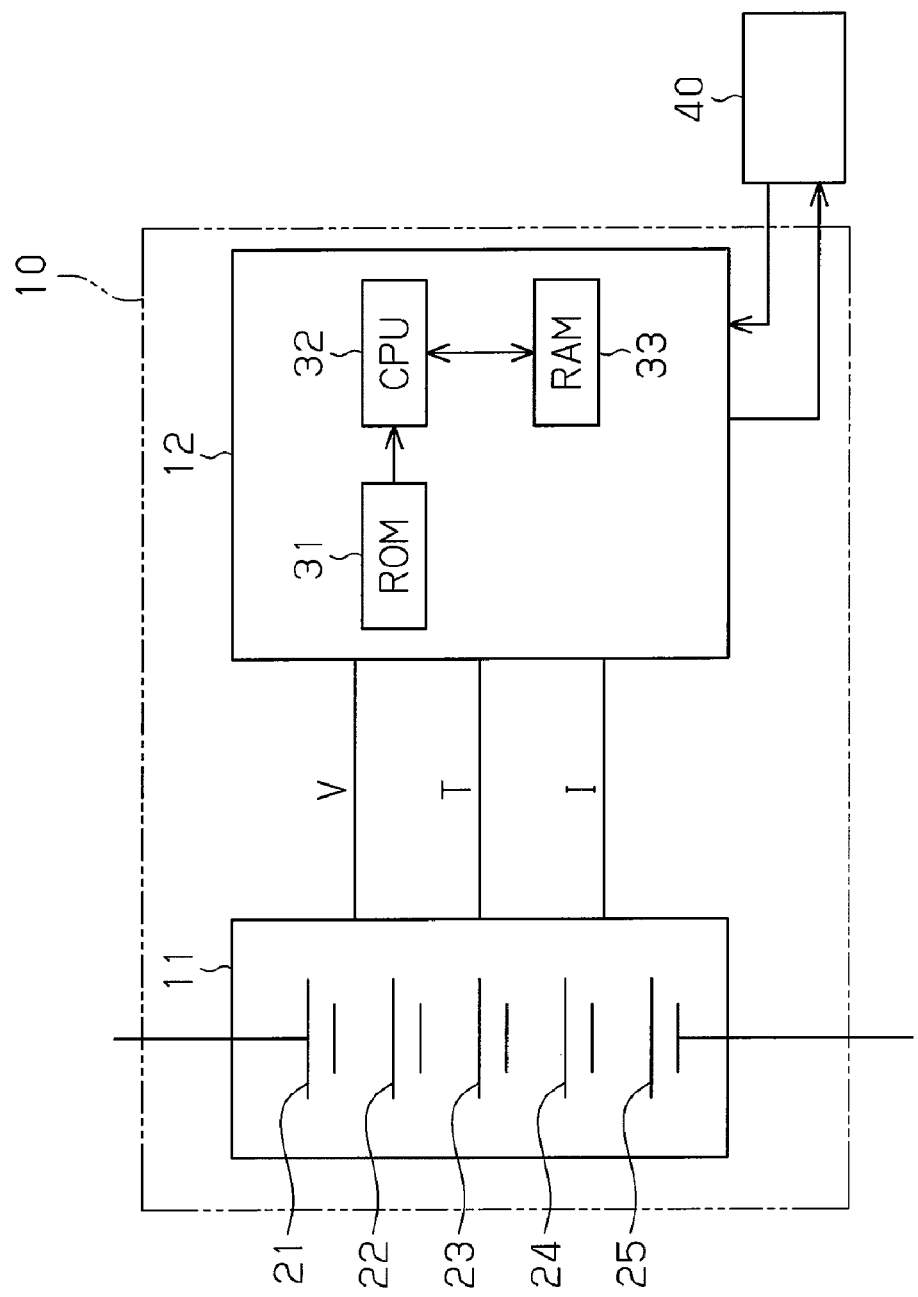
FIG. 1 is a block diagram showing a preferred embodiment of an assembled battery including a controller.

FIG. 1 illustrates a controller-equipped assembled battery 10. The assembled battery 10 may be installed in a vehicle such as an electric vehicle or hybrid electric vehicle. The assembled battery 10 includes an assembled battery main body 11 and a battery controller 12.

Figure 2:
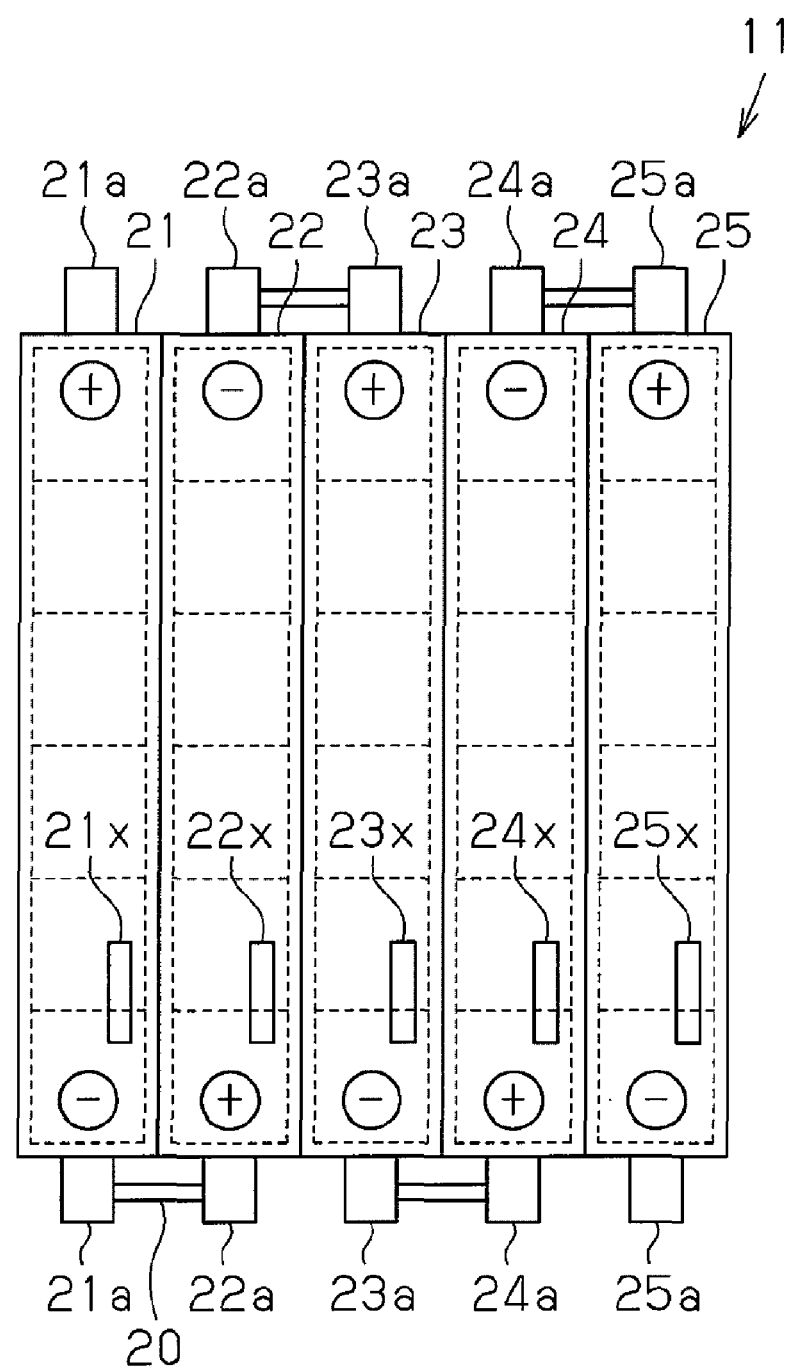
FIG. 2 is a schematic diagram of an assembled battery main body.

The assembled battery main body 11 includes a plurality of rechargeable batteries (in this embodiment, five rechargeable batteries 21 to 23). The two ends of the plurality of rechargeable batteries are restrained by end plates. As shown in FIG. 2, the rechargeable batteries 21 to 25 are electrically connected in series by connection members 20. The rechargeable batteries 21 to 25 are arranged next to one another in the lateral direction. Each of the rechargeable batteries 21 to 25 is a sealed-type nickel-metal hydride battery including a resin integral battery case. Six cells are connected in series in each integral battery case. Each of the illustrated rechargeable battery may be referred to as a module, which is formed by six electric cells and the integral battery case. A rechargeable battery does not have to be formed by six electric cells. Any number of electric cells may be used to form a rechargeable battery. Further, the assembled battery main body 11 does not have to be formed by five rechargeable batteries. Any number of rechargeable batteries may be used to form the assembled battery main body 11.

As shown in FIG. 1, the battery controller 12 includes a ROM 31, a CPU 32, a RAM 33, and the like.

The battery controller 12 controls charge and discharge of the assembled battery main body 11 under the control of a vehicle control unit 40. The battery controller 12 estimates the amount of charge (SOC: State of Charge) and determines the occurrence of an abnormality based on detections of the battery voltage V, battery temperature T, and current I for each of the rechargeable batteries 21 to 25.

As the rechargeable batteries 21 to 25 of the assembled battery 10 (assembled battery main body 11) shifts from an initial state to a used state with charging and discharging being repeated for a certain number of times, the electrolyte of each rechargeable battery decreases. Decrease in the electrolyte amount affects the battery characteristics. The inventors of the present application have found that the decrease in the electrolyte amount of the rechargeable batteries 21 to 25 over the same usage period differs depending on the usage environment (environmental temperature), usage frequency (travel frequency), and the like. Decrease in the electrolyte amount of the rechargeable batteries 21 to 25 is measurable from decrease in the weight of the rechargeable batteries 21 to 25.

Figure 3:
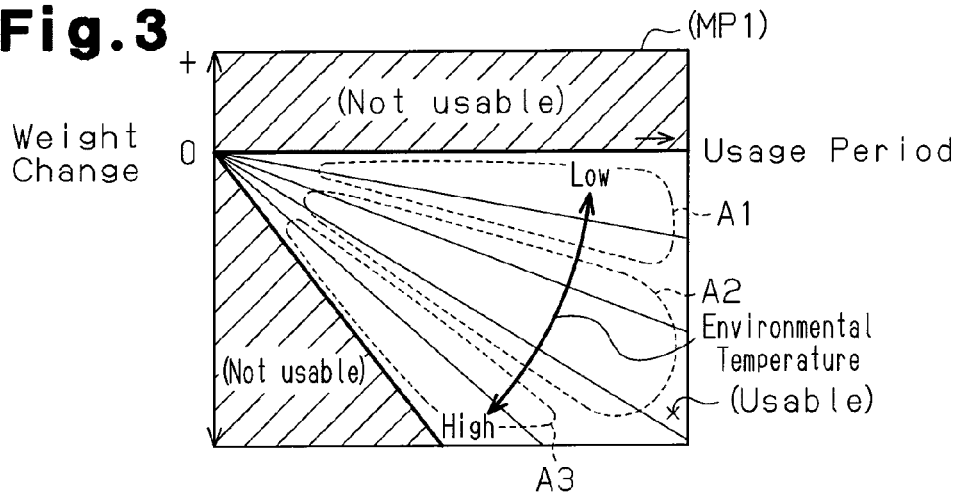
FIG. 3 is a schematic diagram showing a map for estimating the usage environment of the rechargeable battery, in which the vertical axis indicates changes in the weight of the rechargeable battery, and the horizontal axis indicates the usage period of the rechargeable battery.

FIG. 3 shows a map MP1 indicating the correlation of the usage period (elapsed time from when the initial use starts) of the rechargeable batteries in the assembled battery main body 11 and the change in weight of the rechargeable batteries. The map MP1 shows three groups (A1, A2, and A3) divided in accordance with the change in weight for the same usage period in an ascending order. The groups A1, A2, and A3 are also referred to as a usage environment groups. The weight of a rechargeable battery decreases as usage continues. For a nickel-metal hydride battery that includes a resin battery case, it is considered that the weight decreases mainly because water and hydrogen gas, which is a reaction active material, in the electrolyte gradually leak out of the battery through the resin battery case or the packing of a safety valve. The decrease in the weight of a rechargeable battery that affects the battery characteristics has a significant relationship with the environmental temperature of the rechargeable batteries 21 to 25, which may be the average temperature of the region in which the vehicle incorporating the assembled battery 10 is located. If the region in which the rechargeable battery is used is a low temperature region, a small amount of water leaks out since the water vapor partial pressure is low in the battery case. Thus, the decrease of the electrolyte is small. Such a rechargeable battery is classified in group A1 of FIG. 3. If the region in which the rechargeable battery is used is a high temperature region, a large amount of water leaks out since the water vapor partial pressure is high in the battery case. Thus, the decrease of the electrolyte amount is large. Such a rechargeable battery is classified in group A3 of FIG. 3. If the region in which the rechargeable battery is used is a middle temperature region, such a rechargeable battery is classified in group A2 of FIG. 3. In this manner, the change in weight relative to the usage period of the rechargeable batteries 21 to 25 may be checked to obtain the environmental temperature of the region in which the rechargeable batteries 21 to 25 were used.

The heating of the rechargeable batteries 21 to 25 may be given as a factor other than the environmental temperature related to the decrease in the electrolyte amount that affects the battery characteristics. The heating of the rechargeable batteries 21 to 25 further increases the water vapor partial pressure in the battery case. This further increases the water that leaks out of the battery case. The heating of the rechargeable batteries 21 to 25 themselves is assumed to have a significant relationship with the usage frequency of the rechargeable batteries 21 to 25, for example, the travel frequency of the vehicle using the batteries 21 to 25.

Figure 5:
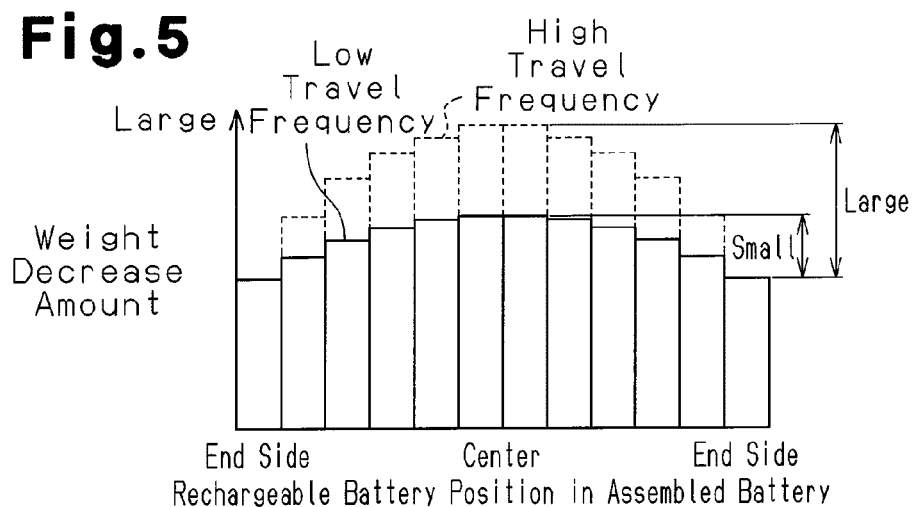
FIG. 5 is an explanatory diagram showing the correlation of the assembly position and battery state, in which the vertical axis indicates the decrease amount and the horizontal axis indicates the positions of the rechargeable battery in the assembled battery.

FIG. 5 shows the correlation of the position of a rechargeable battery (assembly position) in the assembled battery main body and the decrease amount in the weight (electrolyte amount) of the rechargeable battery. FIG. 5 also shows the correlation of the usage frequency and the decreased amount in the weight (electrolyte amount) of the rechargeable battery. FIG. 5 only shows a general tendency for an assembled battery including twelve rechargeable batteries. In view of this tendency, in the assembled battery main body 11 (see FIG. 2) in which the rechargeable batteries 21 to 25 are connected in series and arranged next to one another in the lateral direction as in the preferred embodiment, the decreased amount in the weight was found to be greater for a rechargeable battery located at the central region of the assembled battery main body 11 (e.g., the rechargeable battery 23) than rechargeable batteries located at the ends (near the end plates) of the assembled battery main body 11 (e.g., rechargeable batteries 21 and 25). It is considered that this is because there is a tendency for heat to easily accumulate at the central region of the assembled battery main body 11. Thus, more water leaks out of a battery that is located at such a region.

Figure 4:
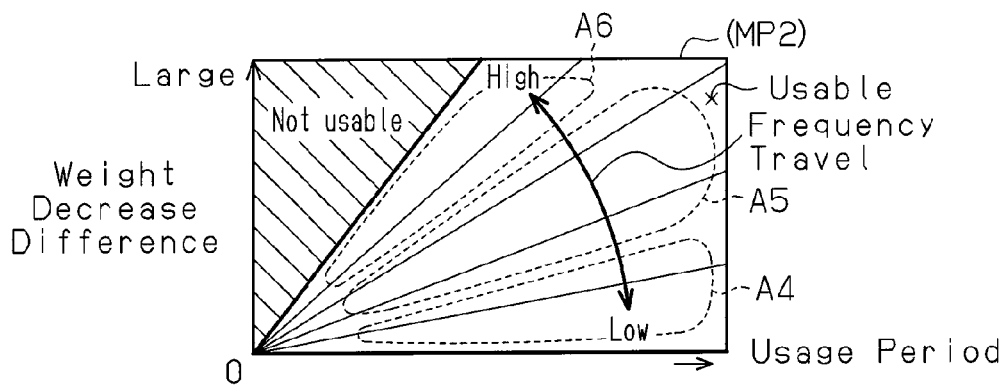
FIG. 4 is a schematic diagram showing a map for estimating the usage frequency of the rechargeable battery, in which the vertical axis indicates weight decrease difference of the rechargeable battery and the horizontal axis indicates the usage period of the rechargeable battery.

FIG. 4 shows the correlation of the usage period and the change in weight, in particular, the correlation of the usage frequency (travel frequency) and the change in weight. Under the same environmental temperature, in an assembled battery in which the usage frequency (travel frequency) is low, the heating of the rechargeable batteries 21 to 25 results in a small increase in temperature. Thus, weight decrease difference, or the difference between the decrease in weight of a rechargeable battery located at the central region of an assembled battery and the decrease in weight of rechargeable batteries located at the ends of the assembled battery, is small. Such a rechargeable battery is classified in group A4 of FIG. 4. In an assembled battery in which the usage frequency (travel frequency) is high, the heating of the rechargeable batteries 21 to 25 results in a large increase in temperature. Thus, the weight decrease difference is large, and such a rechargeable battery is classified in group A6 of FIG. 4. In an assembled battery in which the usage frequency (travel frequency) is moderate, the weight decrease difference is moderate, and a rechargeable battery used in such an assembled battery is classified in group A5 of FIG. 4. In this manner, the usage frequency (travel frequency) of an assembled battery, that is, the average temperature increase during the usage period of the rechargeable batteries 21 to 25 may be obtained by checking the weight decrease difference (in an assembled battery prior to dismantling, the difference between the decrease in weight of a rechargeable battery located at the central region of the assembled battery and the decrease in weight of a rechargeable battery located at the ends of the assembled battery) between the rechargeable batteries located at predetermined positions of the assembled battery. The groups A4, A5, and A6 may also be referred to as usage frequency groups.

The weight of the rechargeable batteries 21 to 25 gradually changes as usage continues from the initial state. However, the weight changes in a manner that is greatly affected by the usage environment (environmental temperature) and the usage frequency (travel frequency). Therefore, the correlations shown by the maps MP1 and MP2 in FIGS. 3 and 4 may be used to estimate the usage environment and usage frequency of the rechargeable batteries 21 to 25. That is, the battery characteristics (charge and discharge characteristics) may be estimated.

In view of the findings discussed above, the inventors of the present invention have studied procedures for collecting assembled batteries from vehicles that will be scrapped or rechargeable batteries that become defective due to early drainage, malfunctions, and the like from users to rebuild (rebuilding) an assembled battery that can be reused and return the rebuilt assembled battery again to a user. The procedures are shown in FIG. 6.

Block S1: The assembled battery 10 (assembled battery main body 11), which includes the rechargeable batteries 21 to 25 that are reusable, is collected from a user.

Block S2: The rechargeable batteries 21 to 25 are dismantled from the collected assembled battery 10 (assembled battery main body 11). The rechargeable batteries 21 to 25 are dismantled for two reasons. The first reason is in that it is troublesome to dismantle the assembled battery 10 into electric cells because connection terminals (not shown) of each electric cell is hidden in each of the rechargeable batteries as shown in FIG. 2. The second reason is in that various types of tests and inspections may easily be conducted by using connection terminals 21a to 25a because the connection terminals 21a to 25a of the rechargeable batteries 21 to 25 are exposed or may easily be exposed.

Block S3: Individual rechargeable battery information is read out from printed data portion 21x to 25x of the rechargeable batteries 21 to 25. The individual information includes the manufacturing date and initial weight of the rechargeable battery and may be printed at the time of manufacture. In the example shown in FIG. 2, the printed data portions 21x to 25x are printed through laser marking and the like on a discernible part of each of the rechargeable batteries 21 to 25. The individual information in each of the printed data portions 21x to 25x includes the manufacturing date and initial weight of the rechargeable battery (weight of rechargeable battery), the assembly position in the assembled battery main body 11, and the like.

Block S4: The current weight of each of the collected rechargeable batteries 21 to 25 is measured.

Block S5: The measurement date of the current weight of each of the collected rechargeable batteries 21 to 25 is obtained.

Block S6: The weight decrease amount and usage period of the rechargeable batteries 21 to 25 are calculated based on the initial weights and manufacturing dates acquired from the printed data portions 21x to 25x and the current measured weights and measurement dates of the rechargeable batteries. The weight decrease difference of the rechargeable batteries between predetermined positions in the assembled battery is also calculated. The current measured weight and measurement date of a rechargeable battery are examples of individual information for a dismantled rechargeable battery.

Block S7: Before using the correlation charts of FIGS. 3 and 4, the classification map MP1 related to the usage environment (environmental temperature) and the classification map MP2 related to the usage frequency (travel frequency) are prepared for each type (e.g., every model) of the rechargeable batteries 21 to 25 (FIGS. 3 and 4 show the classification map for only one type), and the classification maps MP1 and MP2 that correspond to the rechargeable batteries 21 to 25 are selected.

Block S8: By referring to the classification maps MP1 and MP2 that correspond to the rechargeable batteries 21 to 25, the usage environment group A1 to A3 to which each of rechargeable batteries 21 to 25 belongs is first determined with the classification map MP1, which is related to the usage environment (environmental temperature), based on the weight decrease amount and the usage period of each of the rechargeable batteries 21 to 25 calculated in block S6. Then, for rechargeable batteries belonging to the same usage environment group, the group A4 to A6 to which each rechargeable battery belongs is determined using the classification map MP2, which is related to the usage frequency (traveling frequency). Through the determinations using the classification maps MP1 and MP2, the rechargeable batteries 21 to 25 are classified into groups having similar battery characteristics (charge and discharge characteristics). In this process, the rechargeable batteries that cannot be reused are separated from rechargeable batteries that can be reused.

Block S9: Measured weights and measurement dates are reprinted in the printed data portions 21x to 25x of the rechargeable batteries 21 to 25 to indicate the initial weight and manufacturing date. The information is held to at least indicate use in a rebuilt battery assembly.

In block S10, the assembled battery main body 11 (assembled battery 10) is rebuilt from the rechargeable batteries 21 to 25 that are dismantled from various assembled battery main bodies 11 using the rechargeable batteries 21 to 25 that have been selected as being reusable and belong to the same group of rechargeable batteries having similar battery characteristics (charge and discharge characteristics). The rebuilt assembled battery main body 11 (or assembled battery 10) is then returned to the user. Through blocks S1 to S10, the assembled battery 10 is rebuilt taking into consideration the absolute characteristics and relative characteristics of the rechargeable batteries 21 to 25. Thus, the assembled battery 10 that is reusable can easily be rebuilt.

The above-described embodiment has the advantages described below.

(1) In the above-described embodiment, the printed data portions 21x to 25x on the rechargeable batteries 21 to 25 of the assembled battery 10 hold in advance the initial individual information of each rechargeable battery, such as the manufacturing date and the initial weight. In the dismantling (block S2), the assembled battery 10 collected from the user is dismantled to retrieve the rechargeable batteries 21 to 25. In the classifying (blocks S3 to S8), the rechargeable batteries 21 to 25 are classified into groups using the classification map MP1, which is related to the usage environment (environmental temperature), and the classification map MP2, which is related to the usage frequency (travel frequency), based on the initial individual information and the individual information obtained from the rechargeable batteries 21 to 25 after the dismantling. In the rebuilding (block S10), the assembled battery 10 is rebuilt (rebuilt) using the rechargeable batteries 21 to 25 that are in the same classified group. Since the rechargeable batteries 21 to 25 that are in the same group have similar battery characteristics, the assembled battery 10 is rebuilt taking into consideration the absolute characteristics and relative characteristics of the rechargeable batteries 21 to 25. Thus, the rebuilt assembled battery 10, which is reusable, is obtained through a simple process.

Since the battery characteristics of the assembled battery 10, which is used as a power source for an electric vehicle or a hybrid electric vehicle, is susceptible to the usage environment, the usage frequency, and the like as in the above-described embodiment, there is a large significance in applying the method of the above-described embodiment to the assembled battery 10.

(2) In the above-described embodiment, the usage environment (environmental temperature when used in a vehicle) is estimated from the initial individual information and the individual information obtained after the dismantling, and the rechargeable batteries 21 to 25 are classified into groups based on the estimated usage environment. Furthermore, in this embodiment, the usage frequency (travel frequency of vehicle using the assembled battery 10) is estimated from the initial individual information and the individual information obtained after the dismantling to as to further finely classify the rechargeable batteries 21 to 25 into groups from the estimated usage frequency. Thus, the rechargeable batteries 21 to 25 are further accurately classified.

(3) In the above-described embodiment, the usage frequency of the rechargeable batteries 21 to 25 is estimated based on the difference in the weight decrease of the rechargeable batteries located at a plurality of predetermined positions in the assembled battery before the dismantling. In other words, differences in weight decrease occur depending on the positions of the rechargeable batteries 21 to 25 due to the influence of temperature distribution and the like in the assembled battery 10. Such difference in weight decrease is correlated with the usage frequency. Thus, the usage frequency is easily and accurately estimated.

(4) In the above-described embodiment, determination of whether or not the rechargeable batteries 21 to 25 are reusable is performed in the classifying. This ensures that a reusable assembled battery 10 is easily rebuilt.

(5) In the above-described embodiment, in the information re-holding (block S9), information indicating at least use in a rebuilt battery assembly is held as the individual information in the rechargeable batteries 21 to 25. Thus, the rebuilt rechargeable batteries 21 to 25 are easily distinguished.

It should be apparent to those skilled in the art that the present invention may be embodied in many other specific forms without departing from the spirit or scope of the invention. Particularly, it should be understood that the present invention may be embodied in the following forms.

In the above-described embodiment, determinations for the classification of the rechargeable batteries 21 to 25 are not described in detail. However, such determinations for the classification may be performed by humans or be mechanically performed under the control of a computer.

In the above-described embodiment, classification of the rechargeable batteries 21 to 25 is performed using both the usage environment (classification map MP1) and the usage frequency (classification map MP2). However, classification may be performed using only the usage environment (classification map MP1). Accurate classification is possible even when using only the usage environment (classification map MP1) since the usage environment has a significant relationship with changes in the battery characteristics of the rechargeable batteries 21 to 25. The classification may also be performed using a map for another type of classification that classifies rechargeable batteries into groups having similar battery characteristics.

In the above-described embodiment, the individual information such as the manufacturing date and the initial weight of the rechargeable battery are printed on the printed data portions 21x to 25x of the rechargeable batteries 21 to 25. Instead of the printed data portions 21x to 25x, an IC tag holding the individual information as electronic data may be arranged on each of the rechargeable batteries 21 to 25.

In the above-described embodiment, the rechargeable batteries 21 to 25 hold the assembly position information as the individual information in advance. However, the assembly position information may be provided to the rechargeable batteries 21 to 25 when the rechargeable batteries 21 to 25 are dismantled from the assembled battery 10. Further, when performing classification with only the usage environment (classification map MP1), the rechargeable batteries 21 to 25 do not have to hold the assembly position information.

In the above-described embodiment, information indicating use in a rebuilt battery assembly is re-printed and held in the rechargeable batteries 21 to 25. However, such information does not particularly have to be re-printed.

In the above-described embodiment, when rebuilding the assembled battery 10, full discharge and replacement are performed in units of rechargeable batteries (units of modules). Instead, full discharge and replacement may be performed in units of cells or units of blocks, which combine a number of modules.

The assembled battery 10 is not limited to use as a power source for a vehicle such as electric vehicle or a hybrid electric vehicle and may be used as a power source for a device other than a vehicle such as a portable device.

The present examples and embodiments are to be considered as illustrative and not restrictive, and the invention is not to be limited to the details given herein, but may be modified within the scope and equivalence of the appended claims.

What is claimed is:

1. A method of reusing a rechargeable battery, the method comprising:
    collecting a plurality of used assembled batteries formed by a plurality of rechargeable batteries, each rechargeable battery holding initial individual information including at least a manufacturing date and an initial weight of the rechargeable battery;
    dismantling the plurality of collected used assembled batteries into the plurality of rechargeable batteries, each holding the individual information;
    calculating a weight decrease amount and usage period of each of the rechargeable batteries based on the initial individual information of the plurality of rechargeable batteries and individual information of the plurality of rechargeable batteries obtained after the dismantling;
    estimating a usage environmental temperature of a region in which each of the rechargeable batteries was used based on the calculated weight decrease amount and calculated usage period of each of the rechargeable batteries;
    classifying the plurality of rechargeable batteries of the dismantled assembled batteries into groups based on the estimated usage environmental temperature; and
    rebuilding a regenerated assembled battery reusing rechargeable batteries that have been classified into the same group.

2. A method of reusing a rechargeable battery, the method comprising:

collecting a plurality of used assembled batteries formed by a plurality of rechargeable batteries, each rechargeable battery holding initial individual information including at least a manufacturing date and an initial weight of the rechargeable battery;

dismantling the plurality of collected used assembled batteries into the plurality of rechargeable batteries, each holding the individual information;

calculating a weight decrease amount and usage period of each of the rechargeable batteries based on the initial individual information and individual information of each of the rechargeable batteries obtained after the dismantling;

estimating a usage environmental temperature of a region in which each of the rechargeable batteries was used and a usage frequency for each of the rechargeable batteries based on the calculated weight decrease amount and calculated usage period of each of the rechargeable batteries classifying the plurality of rechargeable batteries of the dismantled assembled batteries into groups based on the estimated usage environmental temperature and the estimated usage frequency; and rebuilding a regenerated assembled battery reusing rechargeable batteries that have been classified into the same group.

3. The method according to claim 2, wherein the usage frequency of the rechargeable battery is estimated based on the weight decrease amount of the rechargeable battery and position of the rechargeable battery in the assembled battery before the dismantling.

4. The method according to claim 2, wherein the estimating includes estimating the usage environmental temperature of the region in which each of the rechargeable batteries was used and the usage frequency for each of the rechargeable batteries, based on the calculated weight decrease amount, the calculated usage period, a map configured to estimate an usage environmental temperature of a region in which a rechargeable battery was used from correlation between weight decrease amounts and usage periods, and a map configured to estimate a usage frequency of a rechargeable battery from correlation between weight decrease amounts and usage periods.

5. The method according to claim 1, wherein the classifying includes:
determining whether or not each of the rechargeable batteries is reusable for rebuilding a regenerated assembled battery.

6. The method according to claim 1, further comprising:
holding individual information in a rechargeable battery used to form the regenerated assembled battery, with the individual information indicating at least use in a regenerated assembled battery.

7. The method according to claim 1, wherein the assembled battery is used as a power source for an electric vehicle or a hybrid electric vehicle.

8. The method according to claim 1, wherein the estimating includes estimating the usage environmental temperature of the region in which each of the rechargeable batteries was used, based on the calculated weight decrease amount, the calculated usage period, and a map configured to estimate an usage environmental temperature of a region in which a rechargeable battery was used from correlation between weight decrease amounts and usage periods.

9. A method of reusing rechargeable batteries, the method comprising:
dismantling a used assembled battery to extract a plurality of rechargeable batteries;
determining a weight decrease amount and a usage period for each of the rechargeable batteries;
estimating a usage environmental temperature of a region in which each of the rechargeable batteries based used on the weight decrease amount and the usage period;
classifying each of the rechargeable batteries such that each of the rechargeable batteries is placed in a group;
building a regenerated assembled battery from selected rechargeable batteries, wherein the selected rechargeable batteries for the regenerated assembled battery are selected from the same group and have similar characteristics.

10. The method of claim 9, wherein each group includes rechargeable batteries from different used assembled batteries.

11. The method of claim 9, wherein each of the rechargeable batteries is associated with individual information including a manufacturing date and an initial weight, wherein the manufacturing date and the initial weight are used to determine the weight decrease amount and the usage period.

12. The method of claim 11, wherein the weight decrease amount and the usage period are used to determine the usage environmental temperature and wherein classifying each of the rechargeable batteries includes determining whether each of the rechargeable batteries is reusable for rebuilding the regenerated assembled battery.

13. The method according to claim 9, wherein the estimating includes estimating the usage environmental temperature of the region in which each of the rechargeable batteries was used, based on the determined weight decrease amount, the determined usage period, and a map configured to estimate an usage environmental temperature of a region in which a rechargeable battery was used from correlation between weight decrease amounts and usage periods.

* * * * *